July 29, 1952   J. I. HAASE   2,605,198
TIRE BUILDING MACHINE AND METHOD
Filed Aug. 14, 1946   2 SHEETS—SHEET 1
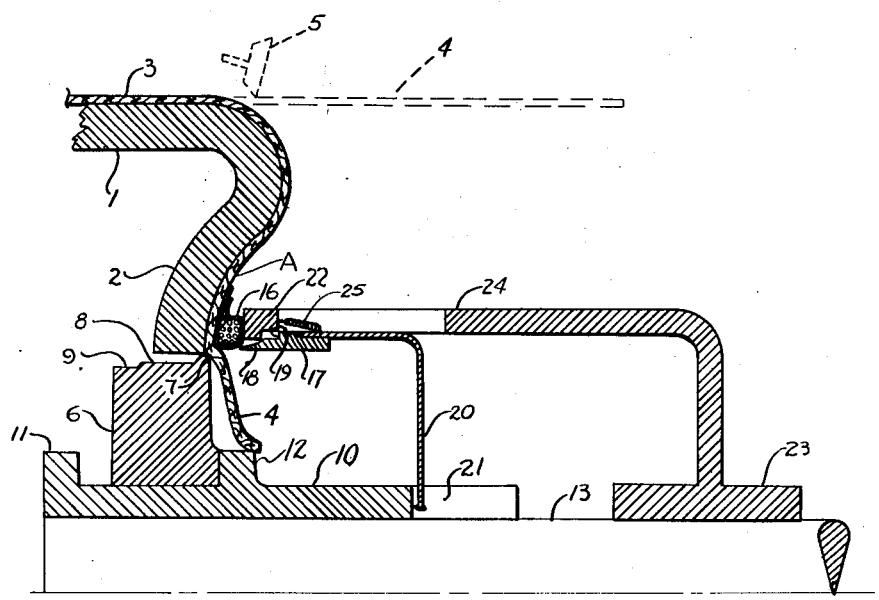
Fig. 2
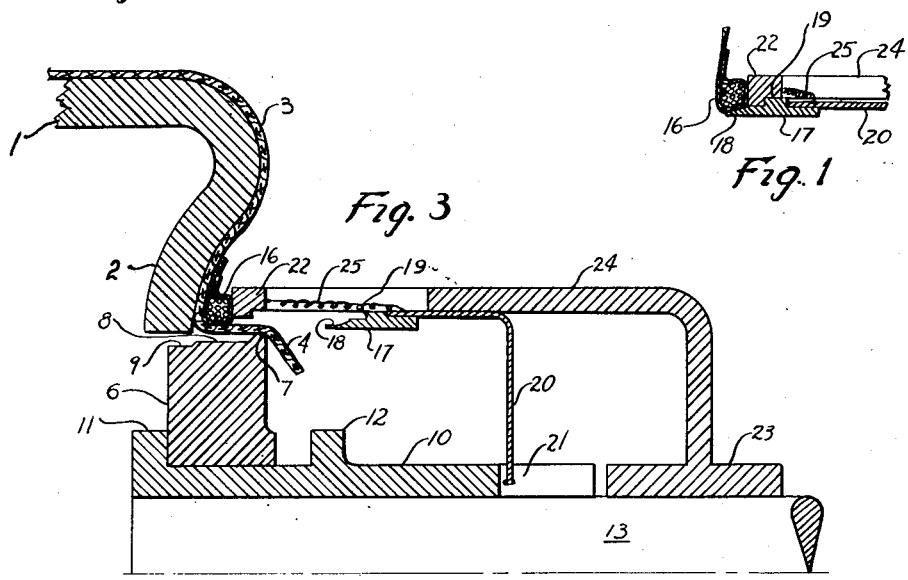
Fig. 3
Fig. 1
INVENTOR.
JORGEN I. HAASE
BY
ATTORNEY July 29, 1952  J. I. HAASE  2,605,198
TIRE BUILDING MACHINE AND METHOD
Filed Aug. 14, 1946  2 SHEETS—SHEET 2
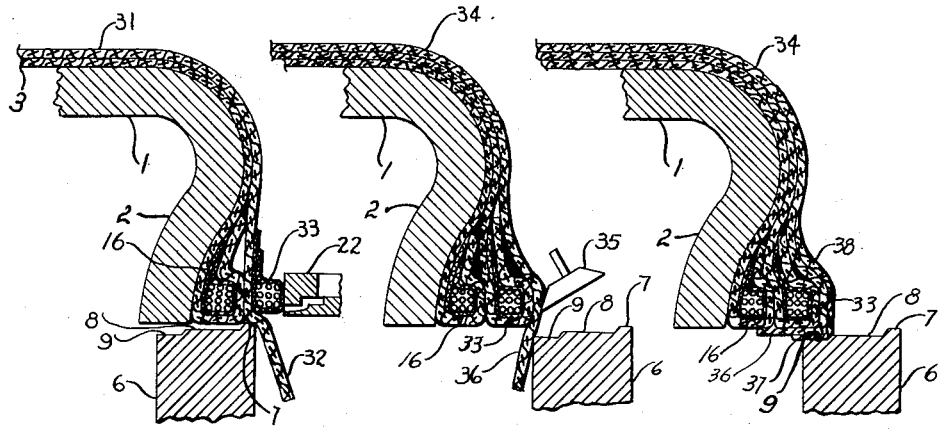
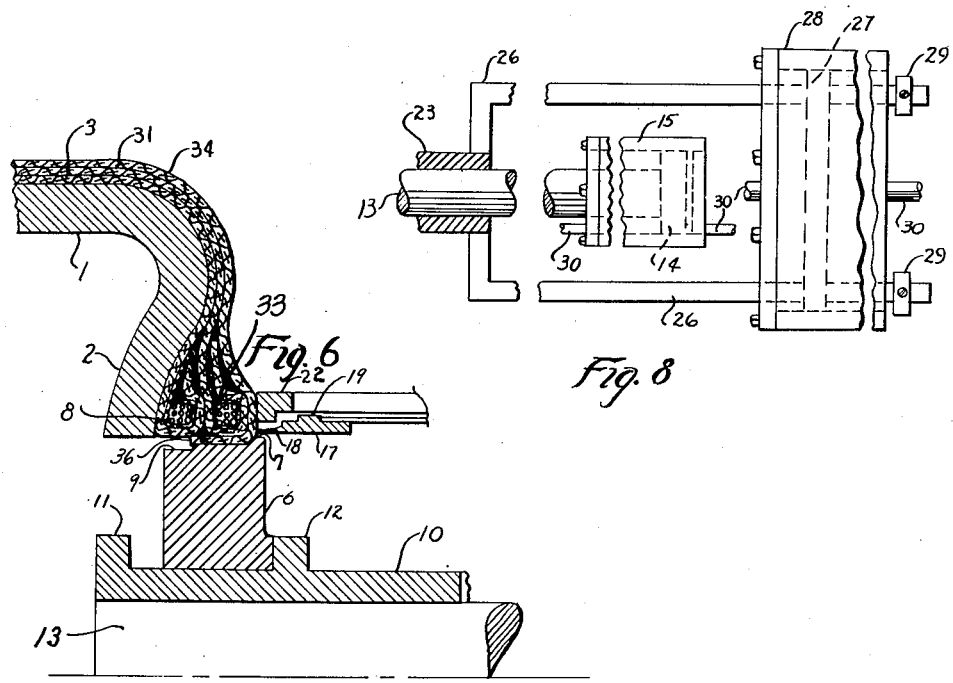
INVENTOR.
JORGEN I. HAASE
BY
ATTORNEY Patented July 29, 1952

2,605,198

UNITED STATES PATENT OFFICE 2,605,198

TIRE BUILDING MACHINE AND METHOD

Jorgen I. Haase, Akron, Ohio, assignor to Wingfoot Corporation, Akron, Ohio, a corporation of Delaware Application August 14, 1946, Serial No. 690,510

7 Claims. (Cl. 154—10)

This invention relates to tire building machines and methods, especially to the methods and means used to suitably fold the radially inwardly extending edge portions of partly positioned tire-ply materials in under the toe and heel of tire beads.

In the present practice the above folding operations, at least insofar as they apply to foldings around the heel of beads, are generally performed by what is shown as progressive stitching, and become more and more difficult and less satisfactory the smaller the bead diameter and the greater the number of plies in the material to be folded. The greater the number of plies in the tire-ply material, sometimes called a band, the stiffer it becomes with attendant folding difficulties. In certain tires, as a matter of fact, existing means are inadequate, and the foldings must be performed by hand by the operator, resulting in fatigue and inefficiency on the part of the operator and lack of quality uniformity in the product. The reason for these and other difficulties lies in the fact that the toe and heel of beads are the areas in a tire in which the greatest and most sudden deformations in the tire material take place while a tire is being built.

One object of the invention is to provide a method of folding in which the same means are used for folding around the toe as around the heel of the bead.

Another object is to provide means which will fold tire material around toe and heel of beads equally efficiently and satisfactorily, substantially irrespective of the stiffness or number of plies in the material to be folded.

Another object is to provide for simultaneous folding of the tire material along the entire periphery of the toe and heel of beads by the same means.

A further object is to provide means which, while folding, simultaneously irons the material being folded into smooth and intimate contact with at least a portion of the surface laying between heel and toe of beads, without any breaks or interruptions in the periphery thereof.

A further object is to cause a partial folding of those tire materials which must be folded around the toe of beads by the mere action of placing the bead in position without as yet having required any motion on the part of the folding means for the purpose of folding.

A further object is to automatically move a bead supporting means progressively away from bead supporting position so as not to interfere with any foldings required around the toe and base of the bead.

A further object is to provide means of the type described which is simple in construction, dependable and efficient in operation, and quickly and easily adaptable to different tire sizes.

The foregoing and other objects and advantages of the invention which will become apparent as the specification proceeds, are secured, broadly speaking, by the provision of an annular pusher-plate which is adapted to force an annular section of the periphery or skirt of radially inwardly extending edge portions of partly positioned tire-ply materials against the toe or heel of a tire bead along the entire perimeter thereof while simultaneously and progressively ironing or pressing such fabric to form a smooth and intimate contact to at least a portion of the base of the bead.

Reference now should be had to the accompanying drawings, wherein:

Fig. 1 is a diagrammatic fragmentary sectional view of apparatus embodying, and for practicing the principles of, my invention showing a bead in place on the bead supporting mechanism;

Fig. 2 is a diagrammatic transverse section of more complete apparatus showing the first bead in position;

Fig. 3 is a diagrammatic transverse section of the apparatus after the first fabric ply or band is folded and ironed out around the toe and against the base of the bead;

Fig. 4 is a diagrammatic, fragmentary section of the bead supporting apparatus after the second ply or band and the second bead is applied;

Fig. 5 is a diagrammatic, fragmentary section illustrating the second ply or band and second bead completely positioned and a third ply or band applied and partially positioned.

Fig. 6 is a diagrammatic transverse sectional view showing the pusher plate after it has folded the skirt of the third ply or band around the heel of the bead and before the pusher plate is withdrawn from the tire;

Fig. 7 is a diagrammatic sectional view, similar to Fig. 6, after the pusher plate has folded a chafing strip around the heel of the bead section; and Fig. 8 is a somewhat diagrammatic view of the position control apparatus of the invention.

Referring in detail to the apparatus shown in the accompanying drawings, a collapsible tire building drum, or core 1 of conventional design is provided. The drum 1 has inwardly extending flanges 2 at each edge thereof and it is adapted to receive the components of a green tire as they are applied to the drum to form a tire carcass. Thus, a cylindrical band or ply 3, which may comprise several separate plies of tire fabric, is applied to the drum 1 with portions of the drum being cemented to the ply to facilitate securing the band on the drum in fixed relation thereto. After the band 3 is applied to the drum, which band is of such width as to extend axially from both sides of the drum, the edges or skirts 4 of the band 3 are stitched down into engagement with the upper portions of the flanges 2 by conventional stitchers 5, as diagrammatically indicated in Fig. 2. Preferably, the skirts 4 are only forced into contact with the flanges 2 to a point indicated at A to facilitate disengaging the finished tire from the drum.

In order to fold the skirts 4 of the band 3 around the toe and heels of the beads the invention provides a pair of pusher plates or rings 6, each of which has a plurality of suitably proportioned cylindrical shoulder portions indicated by numerals 7, 8, and 9. These pusher plates are carried by sleeves 10 between axially inner and outer shoulders 11 and 12, respectively, formed thereon. The sleeves 10 are positioned on and suitably associated for movement with shafts, or plungers 13 that connect to suitable position control means, such as pistons 14 received in hydraulic cylinders 15 (Fig. 8). In all events, the pusher plates 6 are mounted adjacent both axial ends of the drum 1 for movement towards and from the drum, with the shoulders 11 and 12 permitting a predetermined lost motion between the sleeves 10 and the pusher plates 6 on reversal of direction of movement of the plungers 13. Before the skirts 4 are stitched down on the flanges 2, the plungers 13 are moved towards the drum 1 to position the shoulders 7 immediately outside of the flanges 11. See Fig. 2.

A feature of the invention is that the outer diameters of the shoulders 7 are of such size that they are able by axial motion to tightly fold an annular portion of skirt 4 around the toes or inner edges of beads 16 and progressively press further portions of skirts 4 tightly against the radially inner base surfaces of the beads 16. It might be well to here emphasize that it is the uninterrupted fully circumferential character, and the cork-in-bottle fit of the pusher plates and beads which achieves the positive ironing of the band into intimate contact with the bases of the beads in a manner notably free of wrinkles of the type which are so frequently encountered in this area with stiff, many ply bands and using known methods of progressive stitching or not fully circular arcuate plate type expansion discs.

The beads 16 are supported by means of thin bead supporting rings 17 which have axially inwardly extending supporting lips 18 formed thereon as well as radially outwardly extending shoulders 19. The bead supporting rings 17 are secured to and carried by a plurality of circumferentially spaced spider arms 20 the radially inner ends of which are received in slots 21 formed in the sleeves 10. The positions of the bead positioning rings and those of the beads 16 are also controlled by bead pressing rings 22. These rings 22 are of proper diameter to engage with the beads 16 to force them against the skirts 4 and they are supported on tubular members 23 by a plurality of circumferentially spaced spider arms 24 which extend radially outwardly of the members 23 and then axially inwardly so as to act as guides for the bead supporting rings 17. A plurality of circumferentially spaced rings 25 (see Fig. 1) are secured between the bead pressing rings 22 and the bead supporting rings 17 so that the rings are resiliently associated and the bead supporting rings are urged towards the pressing rings to assume the no-load position shown in Fig. 1.

Thus, on axially inward movement of the members 23, the arms 24 carry both the bead pressing rings 22 and the supporting rings 17 in towards the drum 1. When the lips 18 and the beads 16 carried thereby are brought into contact with the skirts 4 and the skirts are moved in adjacent the flanges 2, the spider arms 20 are brought to the bases of the slots 21 in the ends of the sleeves 10 so that further axially inward movement of the bead supporting rings 17 is prevented. The bead pressing rings 22 continue their inward movements until stopped by suitable means associated with their motivating means and the apparatus is in the position shown in Fig. 2. The tubular member 23 is positioned for movement towards and away from the drum 1 by any desired means, such as a pair of diametrically opposed arms 26 which are secured to the tubular members 23 and which clear the cylinder 15 to connect to piston 27 received in hydraulic cylinder 28, all as diagrammatically shown in Fig. 8. The arms 26 may extend completely through the cylinder 28 and have collars 29 or other means for limiting axially inward movement of the arms 26 and hence that of the bead pressing rings 22 so that they do not impact against the flanges 2. However, the rings 22 do function to press the skirts 4 into positions immediately adjacent the flanges 2, as indicated in Fig. 2, without forcing the flanges and skirts into tight engagement as would make their separation difficult when removing a completed tire from the drum. Also, keeping the rings 22 from striking the drum 1 prevents damage to or distortion of the drum 1 in continued use. The axial inward movement of the rings 22 does force the fabric skirt to break or fold around the axially inner corner or toe of the bead due to the position of the plates 6 and shoulders 7, all as shown in Figs. 2 and 4. Conduits 30 supply pressure fluid to the cylinders 15 and 28 for moving the pistons 14 and 27.

In order to fold and press the skirts 4 against the inner periphery of the beads 16, the sleeves 10 and pusher plates 6 are moved outwardly of the drum 1 by fluid action on the pistons 14 while the members 23 are held stationary and the bead pressing rings 22 are retained against the beads. Such movement first occasions lost motion between the sleeves 10 and the pusher plates 6 until the flanges 11 contact the pusher plates but, during such movement of the sleeves, the bead supporting rings 17 are moved farther away from and out from under the rings 22 to provide space for the skirts 4 and pusher plates 6 to move into.

A feature of the invention is that continued outward movement of the plates 6 causes shoulders 7 to simultaneously force, or expand, at one time, annular portions of the skirts 4 radially outwardly against the radially inner periphery of the beads 16 and progressively irons or wipes in circumferentially unbroken manner the skirts into tight, smooth engagement therewith from the toe of the bead out to its heel. It will be recognized that the force holding the bead pressing rings 22 in against the skirts 4 is considerable so that the beads are held in position as the skirts are forced there-against.

The outer edges of the skirts 4 are usually formed into ruffles by the above described movement and, to prevent squeezing such ruffles into hard folds in the fabric between the pressing rings and the pusher plates, the outward movement of the pusher plates 6 is usually stopped in about the position shown in Fig. 3. Then the pistons 27 are energized so as to move the bead pressing rings 22 axially outwardly of the drum, and, after such rings are moved out beyond the edges of the skirts 4, the pusher plates are moved axially outwardly and there is no squeezing action exerted on the ruffles in the skirts. Such pusher plate withdrawal may occasion slight outward movement of the beads 16 and skirts 4 but not of such extent to be harmful. Conventional stitcher means are then usually employed to fold the edges of the skirts 4 back over the outer portions of the beads 16 and the inner skirt sections.

Next a second band or ply of fabric 31 of any desired number of individual plies is placed over the fabric ply 3 in a conventional manner and is turned inwardly of the drum 1 to form skirts 32. Prior to turning the edge portions of the fabric 31 inwardly, the sleeves 10 are moved axially inwardly of the drum by the plungers 13 so that the pusher plates 6 are in the positions shown in Fig. 4. Then second beads 33 are positioned on the skirts 32 by axially inward movement of the bead supporting rings 17 and the bead pressing rings 22, and the skirts 32 are folded up over the beads by outward movement of the pusher plates, as previously explained for the beads 16.

A further novel step in the improved tire manufacturing method is embodied in the folding in of a fabric ply around the beads 16 and 33. For example, a third ply or band of tire fabric 34, which may have a breaker strip thereon, is secured over the tire body on the drum 1 and its edges are turned in by suitable stitchers, diagrammatically indicated at 35, to form skirts 36 on the fabric 34. Then the plungers 13 are moved axially inwardly of the drum to bring the shoulder portions 8 of the pusher plates into engagement with the skirts 36, which shoulders 8 are of such diameters as to be snugly received within the bead sections of the tire when the skirts 36 are folded over the already covered radially inner bead surfaces, as shown in Fig. 6, but the shoulders 7 on the pusher plates are too large to be admitted into the fabric covered bead sections. Hence, the pusher plates, by the shoulders 8, fold the entire peripheries of the skirts 36 in at one time and simultaneously force and iron them into tight, smooth contact with the fabric covered radially inner surfaces of the beads 16 and 33. Such action occurs progressively from the axially outer or heels of the beads to the axially inner toes of the beads.

Fig. 6 shows that the bead pressing rings 22 are then brought in against the beads 33 to hold them in position while the plungers 13 withdraw the pusher plates 6 from the beads.

Fig. 7 shows a final novel operation in the use of the reduced shoulder portions 9 of the pusher plates 6 to secure the radially inner edges or skirts 37 of chafing strips 38 to the radially inner surfaces of the bead sections of the tire. This securing action is the same simultaneous expanding and wiping action as explained hereinbefore for the skirt 36. The strips 38 are first secured in any conventional manner to the outsides of the bead sections so as to form the radially inwardly extending skirts 37 that extend beyond the radially inner surface of the beads. The pusher plates then are moved into the tire in the manner indicated in Fig. 7.

It will be realized that conventional tire plies will be used in the practice of the invention and also that the skirts 36 and 37 of the ply 34 and the chafing strips 38 may extend to the axially inner bead corners, if desired. If this is desired, then the portions 8 and 9 are made of such width as to force the entire skirt into contact with the beads, or the inner skirt portions might be otherwise pressed into engagement with the beads after the difficult corner folds are made by the pusher plates.

The tire on the drum 1 may be completed by any conventional method desired. Release of the tire from the drum will be expedited due to the fact that the bead sections of the tire were not secured against the entire surfaces of the drum flanges in the tire manufacture. Well constructed tires with the individual plies in smooth, tight contact with the tire beads are obtained by practice of the invention and a novel, increased efficiency tire building apparatus and process has been provided so that the objects of the invention are achieved.

In the drawings, only one side of a tire building drum has been shown, but it will be realized that the apparatus for the other side of the tire is the same in principle only adapted for use on the opposite tire flange.

While in accord with the patent statutes I have specifically illustrated and described one embodiment of my invention, it should be particularly understood that I am not to be limited thereto or thereby, but that the scope of my invention is defined in the appended claims.

What is claimed is:

1. In a tire building machine, a cylindrical drum having inwardly turned flanges at its edges, a pusher plate having its outer periphery of cylindrical form with a shoulder formed on its axially outer edge, means for mounting said pusher plate adjacent said drum in alignment with the axis of said drum, means for telescoping said pusher plate into and away from substantial engagement with a flange of said drum, a bead pressing ring of slightly larger inner diameter than the inner diameter of the bead to be positioned on a tire body, a thin bead support ring for engaging with said bead pressing ring, said bead support ring having a smaller internal diameter than said bead pressing ring and normally extending axially inwardly therefrom to form a seat for a bead when bringing it into contact with a ply of tire fabric on said drum, means for forcing said bead pressing ring and said bead support ring and a bead carried thereby into engagement with the edge section of a tire ply on said drum, means for withdrawing said bead support ring from engagement with the bead as the bead pressing ring presses the bead against the edge section of a tire ply, said bead pressing ring being retained against the bead to hold it against the edge of the tire ply on said drum, and means for withdrawing said pusher plate from substantial engagement with said drum so as to engage the shoulder of said plate with any fabric on said drum and extending inwardly thereof at the edges of the drum so as to press the entire circumference of such fabric out against the inner surface of the bead held against the tire ply by said pressing ring.

2. In an automatic tire building machine, a cylindrical drum having inwardly turned flanges at its edges, a pusher plate having an outer periphery of cylindrical form of smaller diameter than said drum, means for mounting said pusher plate adjacent said drum in alignment with the axis of said drum and for telescoping said pusher plate into and out of substantial engagement with a flange of said drum, a shoulder on said mounting means, a bead pressing ring of slightly larger radially inner diameter than the radially inner diameter of the bead to be positioned on a tire body, a spider having axially directed fingers for mounting said bead pressing ring, means for moving said spider towards and away from said drum and for retaining it in a given position, a thin bead support ring resiliently associated with said bead pressing ring, said bead support ring having a smaller diameter than said bead pressing ring and extending axially inwardly therefrom to form a support for a tire bead when the bead is being brought into engagement with a ply of tire fabric on said drum, and means extending radially inwardly from said bead support ring and adapted to engage with the shoulder on said pusher plate mounting means to move said bead support ring out from under said bead pressing ring as the pusher plate is moved under the bead.

3. In a tire building machine, a cylindrical drum having inwardly turned edge flanges, a pusher plate having its outer periphery of cylindrical form with a shoulder formed on its outer edge, a sleeve for mounting said pusher plate adjacent said drum in alignment with the axis of said drum, said sleeve having shoulders formed on its periphery for positioning said pusher plate but permitting limited movement therebetween, means for moving said sleeve so that said pusher plate is either in association with a flange of said drum or for retaining said plate axially outside and spaced from such flange, a bead pressing ring of substantially the same inner diameter as the bead to be positioned on a tire body, means for moving said bead pressing ring into engagement with the inwardly turned edges of a tire ply on said drum to secure a bead to such ply and for retaining such ring thereagainst, and means for moving said pusher plate axially outwardly of said drum so as to force the shoulder of said plate against the ply of fabric on said drum and extending inwardly thereof at the edges of the drum so as to draw such fabric out to substantial sleeve form and to press the fabric tightly against the inner periphery of a bead held in position by said bead pressing ring.

4. In a tire building machine, a bead pressing ring of slightly larger internal diameter than the bead to be positioned by the machine, a thin bead positioning ring having a smaller internal diameter than said bead pressing ring, and tension springs holding said bead positioning ring under said bead pressing ring and normally retaining them in engagement, said bead positioning ring having an inwardly directed lip which is adapted to protrude out from the inner surface of said bead pressing ring and form a seat for a bead when the bead is being positioned on a tire, and positive means engaging with the bead positioning means to move said bead positioning means out from under the bead and against the action of the tension springs to leave the bead pressing ring in engagement with the side of the bead.

5. In automatic tire building machinery, a pusher plate having a cylindrical body portion with an annular shoulder having a cylindrical outer surface, said shoulder being at the outer edge of said pusher plate and having its inner edge beveled off to meet said body portion smoothly, said shoulder being adapted to engage with radially inwardly directed fabric on a tire building drum to simultaneously press annular portions of it out against a tire bead when said pusher plate is moved axially outwardly with relation to the drum so that such fabric can be turned back over the bead, said cylindrical body portion being adapted to engage with a skirt of the outer ply of a tire body on the drum and force it inwardly into tight engagement with the inner periphery of the tire bead section of a tire upon movement of the pusher plate toward the drum, said shoulder being adapted to abut against such tire bead section to limit relative telescopic movement of the cylindrical body portion of said pusher plate into the tire.

6. In tire building machinery, a pusher plate having a substantially cylindrical body portion which is of reduced diameter at one edge portion and which is of enlarged diameter at the opposite edge portion, said enlarged portion being of proper maximum diameter to force with full circle contact an annular portion of a skirt of tire fabric simultaneously out radially into tight engagement with the inner periphery of a tire bead, said body portion being of proper diameter to force with full circle contact the entire periphery of a tire ply at one instant into engagement with the entire inner periphery of a tire bead having one band of fabric thereover, and said reduced diameter portions being of proper diameter to force at one instant with full circle contact the skirt of a chafing strip into engagement with the entire inner periphery of a tire bead having two bands of tire fabric thereon.

7. In a tire building process, the steps of applying a band of tire fabric to a tire building drum, which fabric extends axially beyond both sides of the drum, turning the edge portions of the tire fabric radially inwardly to form skirt portions, moving tire beads into engagement with the skirts, moving the entire circumference of annular portions of the skirts radially outwardly against the radially inner surfaces of the beads and wiping the skirts with full circle contact pressure into smooth engagement with the beads, stitching the edges of the skirts back on themselves around the beads, applying a second band of tire fabric over the first band so as to form a second pair of fabric edge sections which extend axially beyond the sides of the drum, turning the edge portions radially inwardly to form skirt portions, moving tire beads into engagement with the skirts, moving annular portions of the skirts of the second band out against the inner surfaces of the second beads and wiping the skirts with full circle contact pressure into smooth engagement therewith, stitching the edges of the skirts of the second band back on themselves around the second beads, applying a third band of tire fabric over the second band so as to form a third pair of fabric edge sections, turning such edge sections radially inwardly to form skirt portions, moving the entire peripheries of the skirts axially inwardly and wiping them with full circle contact pressure into smooth engagement with the radially inner surfaces of the fabric covered beads, applying chafing strips to the axially outer covered bead surfaces which strips extend radially inwardly from the bead sections, and moving the entire peripheries of the radially inner portions of the chafing strips axially inwardly and wiping them with full circle contact pressure into smooth engagement with the radially inner surfaces of the fabric covered beads.

JORGEN I. HAASE.

REFERENCES CITED

The following references are of record in the file of this patent:

UNITED STATES PATENTS

| Number | Name | Date |
| --- | --- | --- |
| 2,239,453 | Bostwick | Apr. 22, 1941 |
| 2,313,035 | Breth | Mar. 9, 1943 |
| 2,316,369 | Shook | Apr. 13, 1943 |
| 2,374,391 | Sternad et al. | Apr. 24, 1945 |